United States Patent [19]

Duggins

[11] 4,173,656

[45] Nov. 6, 1979

[54] MEANS AND METHOD FOR AGING LIQUOR

[76] Inventor: Richard S. Duggins, 41 Mountainside Dr., Wayne, N.J. 07470

[21] Appl. No.: 660,720

[22] Filed: Feb. 23, 1976

[51] Int. Cl.² .................. C12H 1/12; C12H 1/22
[52] U.S. Cl. .................................. 426/422; 426/592; 99/277.1; 99/277.2
[58] Field of Search ............... 426/422, 592; 99/277.1, 99/277.2

[56] References Cited

U.S. PATENT DOCUMENTS

| | | | |
|---|---|---|---|
| 161,642 | 4/1875 | Spier | 426/422 |
| 1,976,091 | 10/1934 | Pritchett | 426/422 |
| 2,086,073 | 7/1937 | Francescar | 99/277.1 |
| 2,108,661 | 2/1938 | Farrier et al. | 99/277.1 |
| 2,203,229 | 6/1940 | Nilsson et al. | 99/277.1 |
| 3,083,098 | 3/1963 | Sullivan | 99/277.1 X |
| 3,386,832 | 6/1968 | McCabe | 99/277.1 X |

*Primary Examiner*—David M. Naff

[57] ABSTRACT

Particulate matter containing particles of charred wood and particles of red layer wood is confined by filter paper in an apertured container having means for causing said container to float when placed in a liquor to be aged. For large commercial applications the container is suspended in the liquor which is periodically agitated.

11 Claims, 9 Drawing Figures

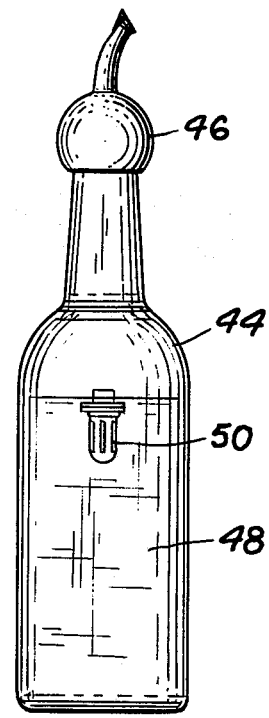
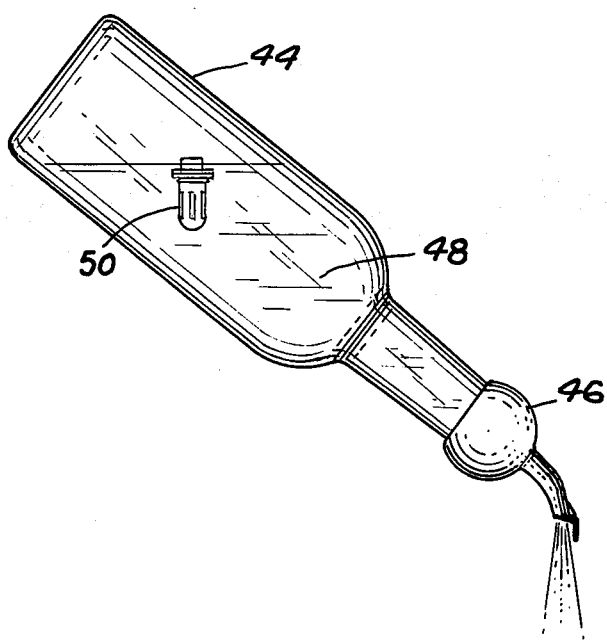
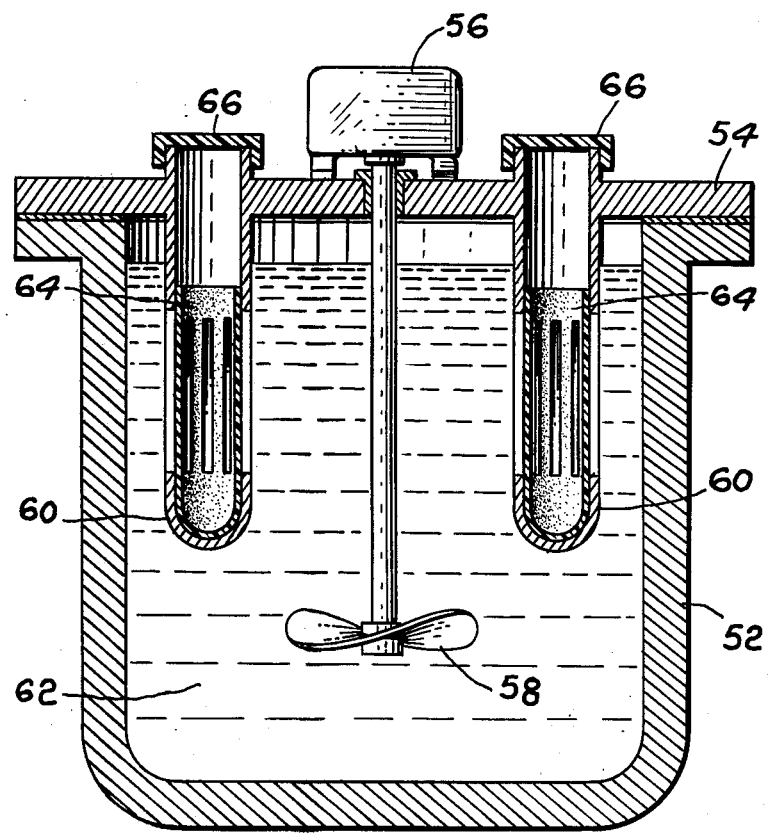

MEANS AND METHOD FOR AGING LIQUOR

BACKGROUND OF THE INVENTION

1. Field of the Invention

The present invention relates to an article for aging beverages and in particular alcoholic liquors such as whiskey, brandy, wine and beer.

2. Description of the Prior Art

Heretofore, alcoholic liquors such as whiskey have been aged in wooden barrels or casks which are charred on the interior prior to placing the liquor therein. The preferred wood for the barrels is white oak which is becoming scarce and very expensive. The liquor is aged in the barrels for several years while the liquor reacts with the charred wood and in general the longer the aging period the finer the liquor. The barrels are usually stored in bonded warehouses which may be temperature controlled thereby requiring valuable storage space for long periods of time. Thus, it is apparent that the cost of properly aging liquor contributes significantly to the overall cost of the final product. For certain premium liquors the problem is compounded since the expensive barrel may not be reused.

In an effort to speed up this aging process various methods and devices have been developed. Many ways have been proposed to increase the interior surface area of the barrel in order to speed the aging process. These proposals have had some beneficial result but were not totally satisfactory since sufficient surface area could not be attained.

Attempts were also made to use wooden blocks, pellets or chips and other substances such as charcoal in porous containers submersed in the liquor, the theory being that the large total surface area of the pieces would speed up aging; however, this was not a satisfactory solution and did not meet with success. The use of small particles resulted in escape of particles from the container causing obnoxious sediment and also resulted in improper aging. Improper aging resulted from two independent causes. Firstly, the liquor was not circulated and only the liquor adjacent the particles was aged. Secondly, in many instances the particles were formed prior to charring and as a result the proper chemical reactions could not take place.

When the wood is properly charred, an interior layer is formed that plays an important roll in the aging process. The so called "red layer" or "red caramel" must be present in order to cause the reaction with the liquor which results in proper aging. When small particles are charred they usually char all the way through leaving no "red layer" and therefore improper aging and poor whiskey coloration results.

Due to the high cost of properly aging liquors most whiskeys produced today are aged while at 190–200 proof and are thereafter cut using water to reduce their alcoholic content. Many whiskeys are really only a blend of aged whiskeys and neutral spirits. Sixty-five percent of some whiskey blends is merely unaged neutral spirits that give the whiskey a burning and harsh taste.

SUMMARY OF THE INVENTION

The present invention contemplates an inexpensive means for decreasing the aging time of liquor and for continuing the aging process after the liquor is bottled thereby improving the quality of inexpensive liquors.

The present invention may be used by distilleries to eliminate the need for expensive wooden barrels while also reducing the aging time. Using the present invention the liquor may be aged in large enclosed containers that may be made of stainless steel, glass or other non-corroding material. The containers may be reused thereby eliminating the cost of the barrels. The need for warehouse space is reduced since the aging time is shortened and the liquor can be turned out quicker.

The invention also has a significant application for home use. When made in a small size the invention may be placed in a bottle of inexpensive liquor and in a few months the quality will improve to that of much more expensive liquors. A few months aging in the bottle using the present invention is equivalent to a few extra years of barrel aging.

The present invention achieves its extraordinary results by taking into account the function of each layer of material in a charred barrel while also providing substantially increased surface areas. The invention uses pieces of both the charred wood and the "red layer". The charred wood pieces provide a filtering and purifying action while the "red layer" pieces cause the necessary chemical reactions to take place.

The surface area of the wood particles is greatly increased because of the small particles used. The total surface area greatly exceeds that which may be provided by a barrel and therefore the aging process is accelerated. The "red layer" is directly exposed to the liquor and therefore the chemical reaction takes place faster while the pieces of charred wood perform their purifying function.

Another important feature of the present invention is that the aging device is provided with a floatation means which serves two important functions. Firstly, it enhances circulation of the liquor through and passed the wood particles. The slightest movement of the container, even the vibrations of one walking in a room, will cause the floating device to move about thereby exposing more liquor to the wood particles by creating a circulation passed the wood. Secondly, when used in a bottle for aging the device will float upwardly and away from the pouring spout when liquor is being dispensed; therefore, the device will not block the flow of liquor from the bottle.

It also has been discovered that the liquor ages faster after it is cut from the usual 190–200 proof to about 85 proof. Thus, use of the present invention for bottle aging at the lower proof becomes particularly advantageous and results in rapid aging and improvement of the liquor.

The pieces of wood are retained in a cylinder formed of filter paper thereby preventing the escape of particles of wood that would prove to be obnoxious to a home user.

The primary objective of the present invention is to reduce the time required to age liquor.

Another objective is to eliminate the need for expensive wooden barrels for aging liquor.

Another objective is to provide a means for aging liquor in a bottle.

Another objective is to provide a means for improving the quality of an inexpensive liquor.

The above-mentioned objectives and advantages of the present invention will become apparent from the detailed description of the invention which follows and from the drawings referred to therein.

DESCRIPTION OF THE DRAWINGS

FIGS. 7 and 8 show the present invention being used in a bottle.

FIG. 9 is a vertical section of a commercial embodiment of the present invention.

DESCRIPTION OF THE INVENTION

Figure 1:
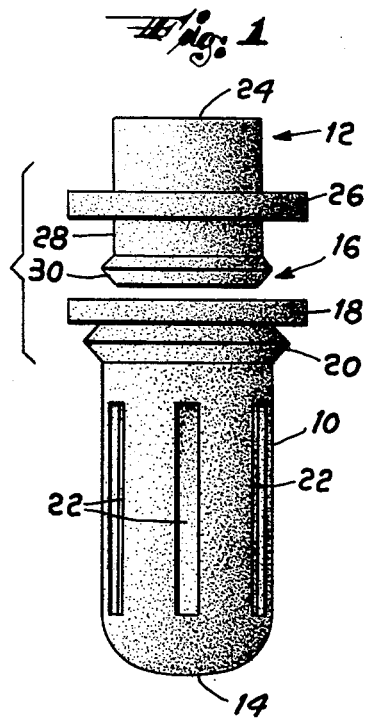
FIG. 1 is an elevational view of one embodiment of the present invention shown unassembled.

The present invention contemplates the use of a volume of wood particles of a granular consistency and about the size of large coffee grounds so that a large total surface area is provided by a small volume of particles. The wood particles should be essentially dust free since dust would serve no useful function and would only tend to fill the spaces between the adjacent particles and prevent the flow of liquid through the spaces. The particles should be made preferrably of white oak, but this is not essential to obtaining beneficial results from the invention.

The preparation of the particles is important if the desired results are to be achieved. In preparing the wood a clean piece of wood must be obtained and charred using techniques well known in the art of aging liquor. The wood may be passed through a high temperature gas flame similiar to that used to char whiskey barrels. Alternatively, the block could be charred by placing it in a high temperature oven. After charring the particles are then formed using a very coarse scraping device such as a rasp or a slow speed large toothed saw. The rasp is used to remove all of the char and the "red layer" thereby producing particles of char, "red layer" and plain wood. Dust particles may be blown or vacuumed from the wood particles. The charred and "red layer" particles could at this point be merely placed in the liquor and the liquor allowed to age; however, the liquor would have to be subsequently filtered which may not be acceptable.

An alternate method of producing the desired wood particles would be to first form the particles as previously described and then remove the dust. The particles may then be controllably roasted at different times or temperatures to produce char particles and "red layer" particles. If roasting is controlled properly and terminated at the proper time the particles will become "red layer" particles just prior to charring.

It is contemplated that the wood particles may be rolled in standard filter paper in a manner similiar to the rolling of cigarettes. Equipment substantially identical to cigarette making machinery may be used for mass production.

The wood particles are loosely packed in filter paper cylinders that may have a diameter similiar to that of a cigarette. The packing density must be such that liquor may flow between the particles just as air and smoke may flow through a cigarette. The paper packed particles are then ready for packaging in a container as shown in the drawings.

Referring to FIG. 1 there is shown one embodiment of a capsule contemplated for use with the present invention. The capsule comprises a tubular body 10 and a cap 12. Body 10 and cap 12 are formed of a thin light weight material that is inert in alocholic beverages. It is contemplated that body 10 and cap 12 will be molded from plastic having a thickness just sufficient to make the members self supporting. Thinness is essential so that weight is maintained at a minimum to make floatation easier.

Body 10 is tubular and hollow having a closed end 14 and an open end 16 about which is formed an outwardly extending annular flange 18 which may be used to support the body during insertion of the wood particles and mounting of the cap. Thus, the flange 18 is formed somewhat thicker than the body so that added strength is provided. Just below the flange 18 an outwardly extending annular dimple 20 is provided, the function of which is to retain the cap 12 in place after assembly. Longitudinal slots 22 are formed in body 10, the ends of the slots are spaced from end 14 and dimple 20.

Figure 2:
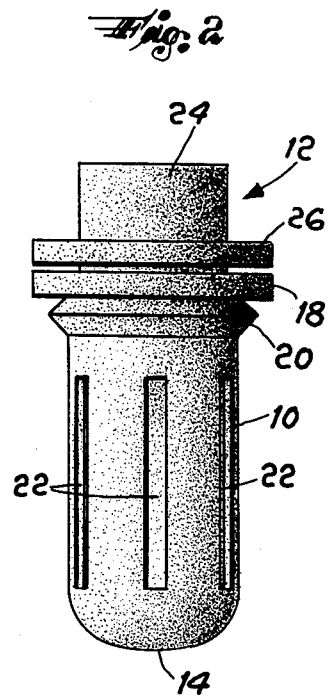
FIG. 2 is an elevational view of the device of FIG. 1 shown assembled.
Figure 3:
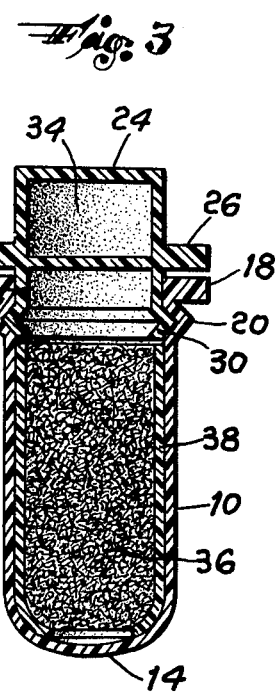
FIG. 3 is a vertical section of the device of FIG. 2.

Cap 12 includes a hollow upper cylindrical portion 24, an outwardly extending flange 26, and a downwardly depending skirt 28. Skirt 28 has a diameter that will fit snugly into opening 16 of the body 10 as shown in FIG. 3. Formed at the end of skirt 28 is an outwardly extending annular dimple 30 that is configured to fit into the concave inside surface of dimple 20 of body 10 when the cap is pressed onto the body as shown in FIGS. 2 and 3. Flange 26 is somewhat thicker than the remainder of the cap so that force may be applied thereto when inserting the cap onto the body. As dimple 30 passes through opening 16 the skirt 28 must compress slightly. It may be desireable to form a few vertical slots in skirt 28 to allow for the compression. Cap 12 includes a horizontal inner wall 32 shown in FIG. 3 which defines a closed space 34 within cap 12. The purpose of space 34 is to cause the assembled device to float when placed in liquid. The volume of the space must be sufficient to cause floatation and will be determined by the weight of the capsule and the density of the liquid. It is desirable that the space volume be such that the capsule floats as low in the liquid as possible with just a small portion of the cap showing above the liquid.

Referring to FIG. 3 there is shown a filter paper cylinder 38 containing wood particles 36 said cylinder being formed as previously discussed. The filter paper cylinder 38 is inserted in body 10 and extends from end 14 to the lower edge of dimple 20. The internal diameter of body 10 is such that the cylinder 38 will easily slide in place when dry. After the wood particles become soaked they swell and hold the paper 38 firmly against body to prevent the escape of any particles through slots 22, the ends of which are spaced from the ends of the filter paper cylinder 38, while still allowing a flow of liquid into and out of the capsule. The use of filter paper prevents the formation of any sediment on the bottom of the bottle from the wood.

Figure 4:
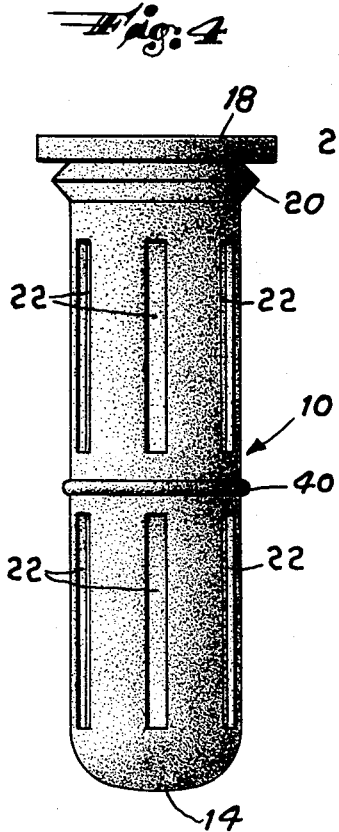
FIG. 4 is an elevational view of an embodiment having an extended length.

Referring to FIG. 4 there is shown a capsule with an extended body 10 formed with a reinforcing ring 40 midway the body to give added strength. The extended body may be used to hold larger volumes of wood particles for use with larger beverage containers that require more wood volume.

Figure 6:
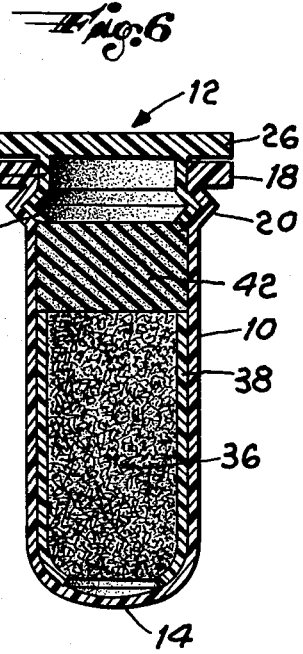
FIG. 6 is a vertical section of the device of FIG. 5.
Figure 5:
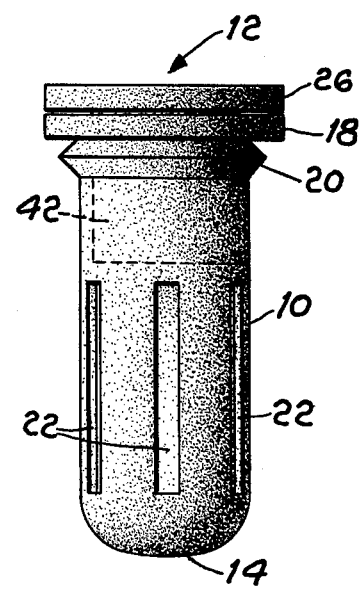
FIG. 5 is an elevational view of another embodiment of the present invention.

FIGS. 5 and 6 show an embodiment wherein the floatation means is a piece of low specific gravity material such as cork or a material of the type that has encapsulated pockets of air such as an expanded plastic foam. In this embodiment the need for the enclosed space 34 is eliminated but a longer body is required to accommodate the floating material 42 which is inserted in the body above the wood particles. Of course a cap similiar to that shown in FIG. 3 without the wall 32 could be used and the material 42 could be inserted in the cap. The remaining elements of FIGS. 5 and 6 are similiar to those of FIGS. 1 to 3 and are therefore identified by the same numbers.

The capsule as illustrated is contemplated for use in liquor bottles and should therefor have a flange diameter of less than three quarters of an inch so that the capsule fits in the bottle. For a fifth or a quart bottle, it is estimated that a volume of wood particles having a length of about three quarters to one inch and the diameter of a standard cigarette would provide desired results in a reasonable period of time. For half gallon and gallon containers the volume of wood required would be proportionally greater and extended bodies such as that shown in FIG. 4 could be used.

Referring to FIGS. 7 and 8 there is shown a capsule 50 inserted in a bottle 44 containing liquor 48 and having a standard pouring spout 46. Because of the use of a floatation means capsule 50 floats low in the liquor. The use of a floatation means is unique and provides two significant advantages.

The first advantage is pertinent to bottle use in that the capsule floats out of the way when pouring as shown in FIG. 8. Without the floatation means the capsule would block the neck of the bottle and interfere with pouring.

The second and more important advantage provided by the floatation means is that it aids in circulation of liquor through the capsule so that proper aging results. The floating capsule easily moves from place to place through the liquid whenever the bottle is moved by the slightest amount. Any vibration or even a person walking on some types of floors will cause movement of the capsule resulting in beneficial circulation.

It must be clearly understood that the invention is not limited to use in bottles alone, but may be used by commercial distilleries in large containers such as drums or tanks thereby eliminating the need for barrels. The capsule used for commercial operations could be much larger and could be designed so that the wood particles could be replaced and the capsule itself reused. Such a device might have a screw top and would be formed of a somewhat sronger and more durable material.

In large commercial operations where liquor is aged in tanks or vats, it may be desirable to have the ability to periodically charge the wood particles. Referring to FIG. 9 there is shown a vat 52 having a cover 54 attached thereto. Mounted on the cover 54 is a motor 56 adapted to drive an agitator 58. Two depending capsule holders 60 extend downwardly into a liquor 62 and support capsules 64. Holders 60 have removable caps 66 through which capsules 64 may be removed and replaced. Holders 60 are apertured to allow liquor to flow therethrough. Capsules 64 may be constructed as previously described except that a floatation means is not necessary. For economy it may be desirable to have motor 56 operated by a timer so that the agitator is only driven periodically to move liquor from the bottom of the vat into the vicinity of the capsule 64. It is only necessary to agitate the liquor a few times a day, four being sufficient.

It is to be understood that only relative agitation between the liquor and the capsule is necessary and this can be accomplished by moving the liquor or rotating the capsules. The agitator could extend into the side or bottom of the vat, but then a sealing problem would be encountered.

It should also be pointed out that for commercial operations the aging may take place after the liquor is cut to a lower proof. The greater volume of liquor could be easily accommodated in large tanks and the decreased aging time resulting from use of the device of the present invention and aging at a lower proof of say 80 to 100 would result in a substantial cost savings. It is also contemplated that distilleries could bottle cut but unaged liquor, including a capsule in the bottle so that aging takes place during the distribution period and while the bottle sits on the retailers shelf.

Thus, the present invention provides an apparatus and method for decreasing the aging time of liquor and eliminating the need for the expensive barrels theretofore used for aging. The apparatus may be used in bottles to age liquor or to improve already aged liquor and make it finer. Commercial applications of the invention contemplate the aging of liquor in drums or large tanks at either the high 190-200 proof level or preferably at 80-100 proof thereby speeding up the process.

The use of fine particles of wood including particles of char and particles of "red layer" assures a rapid and proper aging of the liquor due to the large total surface area presented by a small volume of wood. The use of a filter paper wrap to retain the particles prevents the formation of any obnoxious sediment while allowing a flow of liquid through the capsule. The floatation means assists in causing a liquid circulation passed the particles and assures proper aging while also making the capsule particularly adaptable for use in bottles.

The invention may be used in the aging of all liquors such as whiskey, brandy, beer and wine.

It is apparent that the present invention could radically change the entire liquor industry and result in reduced costs to the consumer.

What is claimed is:

1. A composition for use in aging liquors, comprising: particles of charred wood; and
particles of "red layer" wood which may be placed in the liquor to be aged.

2. A method for aging liquor comprising the step of placing particles of charred wood and "red layer" wood in the liquor to be aged.

3. A method as described in claim 2, wherein the liquor is 100 proof or less during the aging step.

4. A device for treating beverges, comprising:
a liquid permeable container;
particles of treating material including particles of red layer wood and charred wood retained in said container; and
means associated with the container facilitating relative movement between a beverage and the container, so that the beverage will flow through the particles for treatment when the device is placed in the beverage.

5. A device as described in claim 4, wherein the movement facilitating means comprises a means for causing the container to float in the beverage.

6. A device as described in claim 4, wherein the container is suspended in the beverage and the movement facilitating means comprises an agitator for moving the beverage about the container.

7. A device as described in claim 6, additionally comprising means for periodically activating said agitator.

8. A device for treating beverages, comprising:
a liquid permeable container;
particles of treating material including particles of red layer wood and charred wood retained in said container; and
means for causing said container to float when placed in a beverage, whereby the container moves about the surface of the beverage whenever the beverage is disturbed thereby causing the beverage to flow through the particles and be treated.

9. A device as described in claim 8, wherein said container includes an apertured body and the treating material is retained by filter paper.

10. A device as described in claim 9, wherein the treating material is particulate matter rolled in said filter paper which is inserted and retained in the container.

11. A device as described in claim 10, wherein the filter paper is in the shape of an open ended cylinder and is filled with the particulate matter.

* * * * *